United States Patent

Urabe et al.

[11] Patent Number: 5,853,831
[45] Date of Patent: Dec. 29, 1998

[54] VIBRATION WELDED HOLLOW MOLDINGS OF POLYAMIDE RESIN COMPOSITION

[75] Inventors: Hiroshi Urabe; Hajime Oyama; Tatsuya Hitomi, all of Hiratsuka, Japan

[73] Assignee: Mitsubishi Engineering-Plastics Corporation, Japan

[21] Appl. No.: 897,316

[22] Filed: Jul. 21, 1997

[30] Foreign Application Priority Data

Jul. 30, 1996 [JP] Japan .................. 8-215921

[51] Int. Cl.$^6$ .................. B29D 22/00
[52] U.S. Cl. .................. 428/35.7; 156/73.1; 156/272.2; 264/442; 264/445; 428/34.4
[58] Field of Search .................. 524/317; 428/35.7, 428/34.4; 156/73.1, 272.2; 264/442, 445

[56] References Cited

U.S. PATENT DOCUMENTS 2,337,834  12/1943  Peters .................. 524/317
5,064,892  11/1991  Hofland et al. .................. 524/317
5,183,843  2/1993  Sakai et al. .................. 524/318

*Primary Examiner*—Ana Woodward

[57] ABSTRACT

The present invention relates to a vibration-molded hollow product comprising a polyamide resin composition which comprises (a) 40 to 89.97% by weight of a polyamide resin,
(b) 10 to 59.97% by weight of a glass fiber, and
(c) 0.03 to 10% by weight of a compound represented by the following formula (1) or formula (2).

$$R^2-O(R^1-O)_n R^3 \quad (1)$$

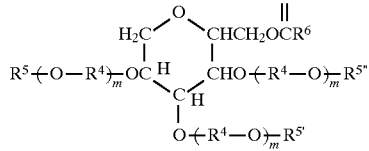

(2)

13 Claims, 2 Drawing Sheets

VIBRATION WELDED HOLLOW MOLDINGS OF POLYAMIDE RESIN COMPOSITION

BACKGROUND OF THE INVENTION

The present invention relates to vibration welded hollow moldings of a polyamide resin composition and, detailedly, polyamide resin hollow moldings produced by first molding plural hollow parts from a polyamide resin composition and joining them by vibration welding. More particularly, the present invention relates to such vibration welded polyamide resin hollow moldings which have high pressure resistance and can be produced without the molding resin material being impaired in fluidity during the process.

The use of plastics has remarkably expanded in recent years, and by taking advantage of their characteristics, it has been attempted to produce various parts such as intake manifolds of automobile engines by use of resins utilizing the vibration welding technique.

Glass fiber reinforced nylon 66, glass fiber reinforced nylon 6 and the like are used as such resin material.

However, when using such resin material for intake manifolds of automobile engines, there is a risk that in case the pressure resistance of the resin material and the manifold made therefrom is not sufficiently high, it may burst when the internal pressure is increased by backfire of the engine. In order to solve the above problem, it has been proposed to increase relative viscosity of the starting material polyamide resin or to increase the welding area to provide a sufficient pressure resistance. The former method, however, has the problem that fluidity of the molding material is lowered to deteriorate moldability, while the latter method necessitates a design change, since a problem occurs because the flange area of welding part is enlarged, so that a larger space for conducting the vibration welding is required.

Thus, it has been demanded to provide vibration-welded polyamide resin hollow moldings having high pressure resistance, which hollow moldings can be produced with no need of a design change for increasing the welding area while maintaining a sufficient fluidity of the molding material throughout the process.

As a result of the present inventors' earnest studies to solve the above problems, it has been found that vibration-welded hollow moldings having high pressure resistance can be obtained by using a polyamide resin composition prepared by blending a specific compound of a specified amount with a base polyamide resin. The present invention has been attained on the basis of the this finding.

SUMMARY OF THE INVENTION

An object of the present invention is to provide vibration welded polyamide resin hollow moldings which have a high pressure resistance and can be produced with no need of a design change for increasing the welding area while maintaining a suitable fluidity of the molding material in the process.

Another object of the present invention is to provide a polyamide resin composition usable for producing vibration welded hollow moldings which have a high pressure resistance and can be produced with no need of a design change for increasing the welding area while maintaining a suitable fluidity of the molding material in the process.

To accomplish the aims, in a first aspect of the present invention, there is provided a vibration-molded hollow product comprising a polyamide resin composition which comprises (a) 40 to 89.97% by weight of a polyamide resin,
(b) 10 to 59.97% by weight of a glass fiber, and
(c) 0.03 to 10% by weight of a compound represented by the following formula (1) or formula (2):

where $R^1$ represents —$CH_2$—, —$CH_2$—$CH_2$— or —CH($CH_3$)—$CH_2$—; $R^2$ represents an alkyl group, an alkenyl group, an alkylcarbonyl group, an alkenylcarbonyl group or a phenyl group; $R^3$ represents a hydrogen atom, an alkyl group, an alkenyl group or a phenyl group, and $R^2$ and $R^3$ do not represent a phenyl group simultaneously; and n is a natural number of 1 to 200,

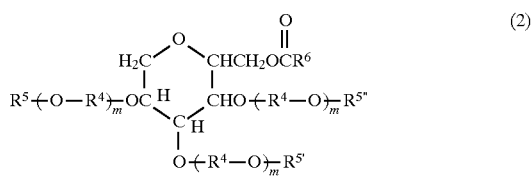

where $R^4$ represents —$CH_2$—, —$CH_2$—$CH_2$— or —CH($CH_3$)—$CH_2$—; $R^5$, $R^{5'}$, $R^{5''}$ represent independently a hydrogen atom, an alkyl group, an alkenyl group, or a phenyl group; $R^6$ represents an alkyl group, an alkenyl group or a phenyl group; and m is a natural number of 1 to 200.

In a second aspect of the present invention, there is provided a polyamide resin composition which comprises (a) 40 to 89.97% by weight of a polyamide resin,
(b) 10 to 59.97% by weight of a glass fiber, and
(c) 0.03 to 10% by weight of a compound represented by the following formula (1) or formula (2):

where $R^1$ represents —$CH_2$—, —$CH_2$—$CH_2$— or —CH($CH_3$)—$CH_2$—; $R^2$ represents an alkyl group, an alkenyl group, an alkylcarbonyl group, an alkenylcarbonyl group or a phenyl group; $R^3$ represents a hydrogen atom, an alkyl group, an alkenyl group or a phenyl group, and $R^2$ and $R^3$ do not represent a phenyl group simultaneously; and n is a natural number of 1 to 200,

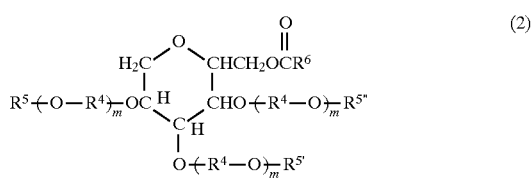

where $R^4$ represents —$CH_2$—, —$CH_2$—$CH_2$— or —CH($CH_3$)—$CH_2$—; $R^5$, $R^{5'}$, $R^{5''}$ represent independently a hydrogen atom, an alkyl group, an alkenyl group, or a phenyl group; $R^6$ represents an alkyl group, an alkenyl group or a phenyl group; and m is a natural number of 1 to 200.

In a third aspect of the present invention, there is provided a method of using a polyamide resin composition for producing a vibration-molded blow-molding product, which polyamide resin composition comprises (a) 40 to 89.97% by weight of a polyamide resin,
(b) 10 to 59.97% by weight of a glass fiber, and
(c) 0.03 to 10% by weight of a compound represented by the following formula (1) or formula (2):

(1)

where $R^1$ represents —$CH_2$—, —$CH_2$—$CH_2$— or —$CH(CH_3)$—$CH_2$—; $R^2$ represents an alkyl group, an alkenyl group, an alkylcarbonyl group, an alkenylcarbonyl group or a phenyl group; $R^3$ represents a hydrogen atom, an alkyl group, an alkenyl group or a phenyl group, and $R^2$ and $R^3$ do not represent a phenyl group simultaneously; and n is a natural number of 1 to 200,

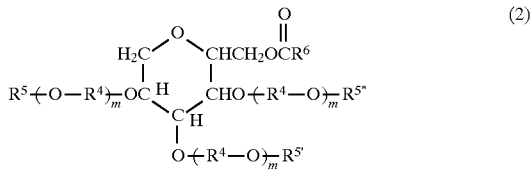

(2)

where $R^4$ represents —$CH_2$—, —$CH_2$—$CH_2$— or —$CH(CH_3)$—$CH_2$—; $R^5$, $R^{5'}$, $R^{5''}$ represent independently a hydrogen atom, an alkyl group, an alkenyl group, or a phenyl group; $R^6$ represents an alkyl group, an alkenyl group or a phenyl group; and m is a natural number of 1 to 200.

DETAILED DESCRIPTION OF THE INVENTION

Figure 1A:
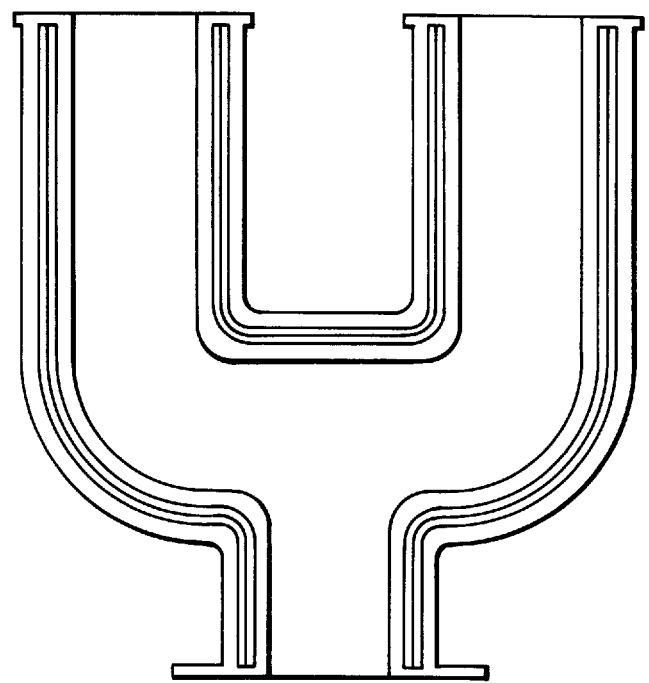
FIG. 1 is plane view showing a pair ((a) and (b)) of molded hollow parts.

The polyamide resin used as component (a) in the present invention can be obtained by polycondensing monomer materials such as polymerizable ω-amino acids or lactams thereof, preferably those of 3- or more membered rings, or dibasic acids and diamines. The ω-amino acids usable as starting monomer materials include ε-aminocaproic acid, 7-aminoheptanoic acid, 9-aminononanoic acid, 11-aminoundecanoic acid, 12-aminododecanoic acid and the like. As lactams, ε-caprolactam, enantholactam, capryllactam, lauryllactam, α-pyrrolidone, α-piperidone and the like can be used.

Examples of the dibasic acids usable as starting monomer include adipic acid, glutaric acid, pimellic acid, suberic acid, azelaic acid, sebacic acid, undecanedioic acid, dodecadioic acid, hexadecadioic acid, hexadecenedioic acid, eicosanedioic acid, eicosadienedioic acid, diglycolic acid, 2,2,4-trimethyladipic acid, xylenedicarboxylic acid, 1,4-cyclohexanedicarboxylic acid, terephthalic acid, and isophthalic acid. Examples of the diamines include hexamethylenediamine, tetramethylenediamine, nonamethylenediamine, undecamethylenediamine, dodecamethylenediamine, 2,2,4-(or 2,4,4)-trimethylhexamethylenediamine, bis-(4,4'-aminocyclohexyl)methane, and metaxylylenediamine.

Of these polyamide resins, nylon 6, nylon 66 and nylon 6/nylon 66 copolymer are preferred for use in the present invention. Different types of the polyamide resins may be used in combination.

The polyamide resin (component (a)) used in the present invention has preferably a certain degree of polymerization or a certain relative viscosity. Namely, the preferred range of relative viscosity of the polyamide resin used in the present invention is 2.0 to 4.0, more preferably 2.5 to 3.7. When the relative viscosity of the polyamide resin is less than 2.0, the pressure resistance of the molded product may be unsatisfactory, and when the relative viscosity is more than 4.0, the fluidity of the polyamide resin composition may lower to deteriorate the surface smoothness of the molded product. The values of relative viscosity shown here are determined in 1% polyamide sulfuric acid (98%) solution at 25° C. according to JIS K6810.

The amount of the polyamide resin blended in the composition of the present invention, although variable depending on the type of the resin used and the hollow molding to be produced, is usually in the range of 40 to 89.97 wt %, preferably 50 to 80 wt %, more preferably 60 to 70 wt % based on the resin composition used in the present invention. When the content of the polyamide resin is less than 40 wt %, the fluidity of the polyamide resin composition may lower. When the content of polyamide resin is more than 89.97 wt %, the weld strength of the molded product may be unsatisfactory.

As the glass fiber used as component (b) in the present invention, a glass fiber of the type commonly used for thermoplastic resins may be used, but chopped strand made of E-glass (non-alkali fiberglass) is preferred. The fiber diameter is usually 1 to 20 μm, preferably 5 to 15 μm. It is also preferable that the glass fibers are surface treated with a silane coupling agent or the like to improve the adhesion to the polyamide. The amount of the glass fiber blended in the composition is 10 to 59.97 wt %, preferably 20 to 50 wt %, more preferably 30 to 40 wt % based on the resin composition used in the present invention. When the content of the glass fiber is less than 10 wt %, the weld strength of the molded product may be unsatisfactory. When its content is more than 59.97 wt %, the fluidity of the polyamide resin composition may lower to deteriorate surface smoothness of the molded product.

The compounds usable as additive (component (c)) in the present invention are represented by the following formulae (1) or (2):

(1)

wherein $R^1$ represents —$CH_2$—, —$CH_2$—$CH_2$— or —$CH(CH_3)$—$CH_2$—, preferably —$CH_2$—$CH_2$—; $R^2$ represents alkyl, alkenyl, alkylcarbonyl, alkenylcarbonyl or phenyl; and $R^3$ represents hydrogen atom, alkyl, alkenyl or phenyl, $R^2$ and $R^3$ are not phenyl at the same time, the carbon number of the above alkyl and alkenyl groups is usually 1 to 60, preferably 5 to 30, the carbon number of the alkylcarbonyl and alkenylcarbonyl groups is usually 2 to 60, preferably 5 to 30, and n is an integer of 1 to 200, preferably 1 to 100, or

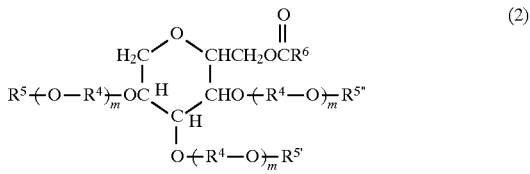

(2)

wherein $R^4$ represents —$CH_2$—, —$CH_2$—$CH_2$— or —$CH(CH_3)$—$CH_2$—, preferably —$CH_2$—$CH_2$—; $R^5$, $R^{5'}$, $R^{5''}$ represent independently hydrogen atom, alkyl, alkenyl or phenyl; and $R^6$ represents alkyl, alkenyl or phenyl, the carbon number of the above alkyl and alkenyl groups is usually 1 to 60, preferably 5 to 30, and m is a natural number of 1 to 200, preferably 1 to 100.

Of the above compounds represented by formula (1), the polyoxyethylene monoaliphatic acid esters of the formula (1) wherein $R^1$ is —$CH_2$—$CH_2$—, $R^2$ is $C_2$–$C_{60}$ alkylcarbonyl or alkenylcarbonyl and $R^3$ is H, are especially preferred.

Of the above compounds represented by formula (2), the sorbitan polyoxyethylene monoaliphatic acid esters or polyoxyethylene alkyl ether monoaliphatic acid esters of the formula (2) wherein $R^4$ is —$CH_2$—$CH_2$—, $R^5$, $R^{5'}$, $R^{5''}$ are H or alkyl and $R^6$ is alkyl or alkenyl, are particularly preferred.

More specifically, the compounds represented by the above formula (1) include polyoxyethylene monoaliphatic acid esters such as polyoxyethylene monolaurate, polyoxyethylene monocetylate, polyoxyethylene monostearate and polyoxyethylene monooleate, polyoxyethylene alkyl ethers such as polyoxyethylene lauryl ether, polyoxyethylene tridecyl ether, polyoxyethylene cetyl ether and polyoxyethylene stearyl ether, polyoxyethylene alkylene ethers such as polyoxyethylene oleyl ether, polyoxyethylene alkylphenyl ethers such as polyoxyethylene nonylphenyl ether and polyoxyethylene octylphenyl ether, and polyoxyethylene alkylenephenyl ether such as polyoxyethylene oleylphenyl ether.

Of these compounds, as the compounds of the formula (1) usable in the present invention, polyoxyethylene monolaurate, polyoxyethylene monocetylate, polyoxyethylene monostearate and polyoxyethylene monooleate are preferred. Polyoxyethylene monolaurate is especially preferred.

Typical examples of the compounds represented by the formula (2) are polyoxyethylene sorbitan monoaliphatic acid esters such as polyoxyethylene sorbitan monolaurate, polyoxyethylene sorbitan monopalmitate, polyoxyethylene sorbitan monostearate and polyoxyethylene sorbitan monooleate and preferably, polyoxyethylene sorbitan monolaurate.

The component (c) is added in an amount of 0.03 to 10 wt %, preferably 0.1 to 5 wt %, more preferably 0.5 to 3 wt % based on the resin composition used in the present invention. When the amount of the component (c) added is less than 0.03 wt %, improvement of pressure resistance of the molded product may be small, and when the amount of component (c) is more than 3 wt %, generation of gas may increase during compounding and molding.

As the added component (c), different types of the component represented by formulae (1) and (2) may be used in combination. In this case, the total amount of component (c) is also within the above definition.

The inorganic fillers other than glass fiber, such as glass flakes, glass beads, mica, talc, kaolin, wollastonite, potassium titanate whiskers, etc., may be blended in the resin composition of the present invention within limits not impairing the effect of the present invention. It is also possible to blend the known additives, for example, heat stabilizer such as copper compounds, release agent, colorant such as carbon black, etc. These inorganic fillers, heat stabilizer, release agent and colorant can be added in a total amount not more than 30 parts by weight based on 100 parts by weight of the resin composition.

Blending of these fillers and additives may be conducted at any stage in the process from polymerization of the polyamide resin to molding, but melt mixing by use of an extruder is most preferable.

In the present invention, plural semi-finished hollow parts molded from the resin composition are joined into a complete hollow molded product by vibration welding. This vibration welding is carried out at a vibration frequency of 100 to 300 Hz and a vibration amplitude of 0.5 to 2.0 mm, preferably 0.8 to 1.6 mm, under a welding pressure of 5 to 100 kg/cm², preferably 10 to 60 kg/cm². Either too high or too low welding pressure causes a decrease of weld strength. The welding time during which a predetermined pressure needs to be maintained, is properly set so that the desired amount of melt is provided for welding, and the retention time after release of pressure is set to allow sufficient solidification of the welded section. Adjustments of such welding pressure and amount of melt can be easily made by using a commercially available control device.

According to the present invention, the fluidity of the polyamide resin compositions is improved, and further the produced vibration welded hollow moldings are enhanced in pressure enduring strength, so that the products of the present invention can be applied to various uses in many fields of industry and find particularly useful application to the intake manifolds for automobiles which require a high degree of safety.

EXAMPLES

The present invention is explained in more detail in the following examples. However, it should be recognized that the scope of the present invention is not restricted to these examples.

Example 1

Nylon 6 (trade name NOVAMID 1015J produced by Mitsubishi Engineering-Plastics Corporation.; relative viscosity=3.0) was used as starting polyamide resin. First, 64.5 wt % of the nylon 6 was blended with 35 wt % of glass fiber (trade name T249GH produced by Nippon Electric Glass Co., Ltd.) and 0.5 wt % of polyoxyethylene monolaurate (trade name Nonion L4 produced by Nippon Oil and Fats Co., Ltd.; average molecular weight=about 400) to obtain a polyamide resin composition.

A twin-screw mixer TBM-35B mfd. by Toshiba Machinery Co., Ltd., was used for the above blending. The blending temperature was set at 280° C.

Figure 1B:
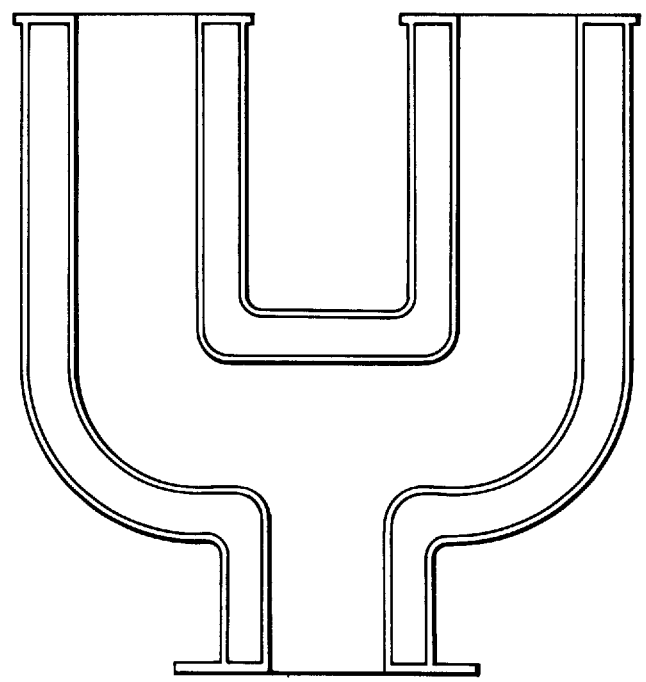

The thus obtained polyamide resin composition was molded by using an injection molder FS160S mfd. by NISSEI Plastic Industrial Co., Ltd., to obtain a pair of moldings shown in FIGS. 1 (*a*) and (*b*). The cylinder temperature was set at 270° C. and the mold temperature was set at 90° C.

Figure 2:
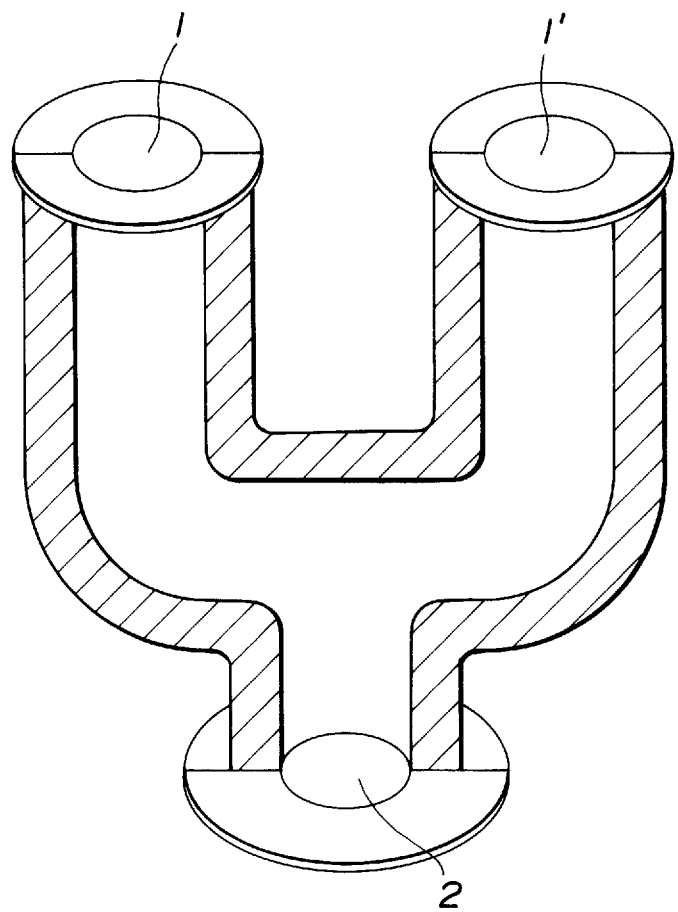
FIG. 2 is a schematic illustration of an example of vibration welded hollow molding and a sectional view along the weld parts.

The obtained pair of moldings was welded by a vibration welder (VIBRATION WELDER Model 2800 mfd. by BRANSON ULTRASONICS DIVISION of EMERSON JAPAN, Ltd.) under the following conditions: vibration frequency=240 Hz; vibration amplitude=1.5 mm; weld depth=1.5 mm; welding pressure=15 kg/cm²; holding pressure=15 kg/cm²; retention time=5.0 sec, thereby obtaining a hollow molded product shown in FIG. 2.

A non-contact WDC weld area control device CX132 mfd. by BRANSON ULTRASONICS DIVISION of EMERSON JAPAN, Ltd., was used for controlling the weld depth.

This hollow molded product was hydraulically pressurized from the bottom opening 2, with the top openings 1, 1' being blanked off, at a pressure inclining rate of 980 kPa/min by using a pressure test machine mfd. by TOYOSEIKI SEISAKU-SHO, Ltd., and the pressure under which blow-up of the hollow molded product took place was measured (pressure resistance). It was 1,720 kpa.

The above polyamide resin composition was spiral molded by using an injection molder IS80EPN mfd. by Toshiba Machinery Co., Ltd., to obtain a spiral molded product having a thickness of 3.0 mm. The cylinder temperature was set at 260° C. and the mold temperature at 80° C.

The flow distance of the obtained spiral molded product was 352 mm.

Examples 2–3 and Comparative Examples 1–2

Glass fiber and the polyoxyethylene compounds shown in Table 1 were blended with nylon 6 in the same way as in Example 1. Nonion LT221 (Nippon Oil and Fats Co., Ltd.) is a polyoxyethylene sorbitan monolaurate represented by the following formula (3).

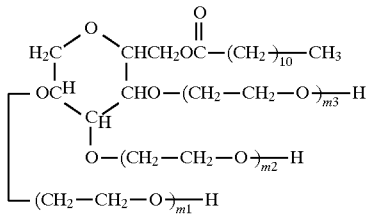

wherein the mean value of m1+m2+m3 is about 21. Each of the thus obtained polyamide resin compositions was molded, the molded pieces were vibration-welded into a complete hollow molded product, and its pressure resistance was measured, all in the same ways as in Example 1. The flow distance of the spiral moldings was also measured. The results are shown in Table 1.

TABLE 1

|  | Polyoxyethylene compounds (trade names) | Amount blended (wt %) | Pressure resistance (kpa) | Spiral flow distance[1] (mm) |
|---|---|---|---|---|
| Ex. 1 | Nonion L4 | 0.5 | 1720 | 352 |
| Ex. 2 | Nonion L4 | 2.0 | 1810 | 359 |
| Ex. 3 | Nonion LT221 | 0.5 | 1550 | 370 |
| Comp. Ex. 1 | Nonion L4 | 0 | 1310 | 332 |
| Comp. Ex. 2 | Nonion L4 | 0.01 | 1340 | 334 |

[1] The shown values of spiral flow distance are the ones obtained under injection pressure of 500 kg/cm$^2$.

What is claimed is:

1. A vibration-molded hollow product comprising a polyamide resin composition which comprises (a) 40 to 89.97% by weight of the resin composition of a polyamide resin, (b) 10 to 59.97% by weight of the resin composition of a glass fiber, and (c) 0.03 to 10% by weight of the resin composition of a compound represented by the following formula (1) or formula (2):

$$R^2-O+R^1-O\overline{)_n}R^3 \qquad (1)$$

where $R^1$ represents —$CH_2$—, —$CH_2$—$CH_2$— or —CH($CH_3$)—$CH_2$—; $R^2$ represents an alkyl group, an alkenyl group, an alkylcarbonyl group, an alkenylcarbonyl group or a phenyl group; $R^3$ represents a hydrogen atom, an alkyl group, an alkenyl group or a phenyl group, and $R^2$ and $R^3$ do not represent a phenyl group simultaneously; and n is an integer of 1 to 200,

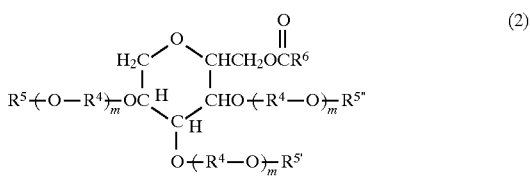

where $R^4$ represents —$CH_2$—, —$CH_2$—$CH_2$— or —CH($CH_3$)—$CH_2$—; $R^5$, $R^{5'}$, $R^{5''}$ represent independently a hydrogen atom, an alkyl group, an alkenyl group, or a phenyl group; $R^6$ represents an alkyl group, an alkenyl group or a phenyl group; and m is an integer of 1 to 200.

2. A vibration-molded hollow product according to claim 1, wherein said polyamide resin is 6-nylon.

3. A vibration-molded hollow product according to claim 1, wherein said compound represented by the formula (1) is monofatty acid polyoxyethylene ester in which in the formula (1) $R^1$ is —$CH_2$—$CH_2$—, $R^2$ is a $C_2$–$C_{60}$ alkylcarbonyl group or a $C_2$–$C_{60}$ alkenylcarbonyl group, and $R^3$ is a hydrogen atom.

4. A vibration-molded hollow product according to claim 1, wherein said compound represented by the formula (2) is sorbitan-(polyoxyethylene alkylether monofatty acid) ester in which in the formula (2) $R^4$ is —$CH_2$—$CH_2$—, $R^6$ is a $C_1$–$C_{60}$ alkyl group or a $C_1$–$C_{60}$ alkenyl group, and $R^5$ is a hydrogen atom or $C_1$–$C_{60}$ alkyl group.

5. A vibration-molded hollow product according to claim 1, wherein the vibration-molded hollow product is an automobile intake manifold.

6. A method of forming a vibration-molded hollow product, said method comprising (i) molding plural hollow parts from a polyamide resin composition comprising (a) 40 to 89.97% by weight of the resin composition of a polyamide resin, (b) 10 to 59.97% by weight of the resin composition of a glass fiber, and (c) 0.03 to 10% by weight of the resin composition of a compound represented by the following formula (1) or formula (2):

$$R^2-O+R^1-O\overline{)_n}R^3 \qquad (1)$$

wherein $R^1$ represents -$CH_2$—, —$CH_2$—$CH_2$— or CH($CH_3$)—$CH_2$—; $R^2$ represents an alkyl group, an alkenyl group, an alkylcarbonyl group, an alkenylcarbonyl group or a phenyl group, $R^3$ represents a hydrogen atom, an alkyl group, an alkenyl group or a phenyl group, and $R^2$ and $R^3$ do not represent a phenyl group simultaneously; and n is an integer of 1 to 200,

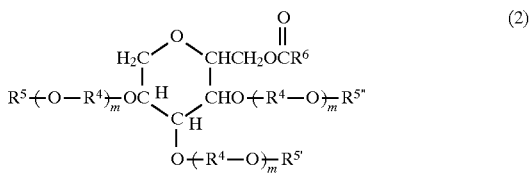

wherein $R^4$ represents —$CH_2$—, —$CH_2$—$CH_2$— or CH($CH_3$)—$CH_2$—; $R^5$, $R^{5'}$, $R^{5''}$ represent independently a hydrogen atom, an alkyl group, an alkenyl group, or a phenyl group, $R^6$ represents an alkyl group, an alkenyl group or a phenyl group; and m is an integer of 1 to 200, and (ii) vibration welding the molded hollow parts of step (i) to form a vibration-molded hollow product.

7. The method of claim 6, wherein said polyamide resin is 6-nylon.

8. The method of claim 6, wherein said compound represented by the formula (1) is a monofatty acid polyoxyethylene ester wherein $R^1$ is —$CH_2$—$CH_2$—, $R^2$ is a $C_2$–$C_{60}$ alkylcarbonyl group or a $C_2$–$C_{60}$ alkenylcarbonyl group, and $R^3$ is a hydrogen atom.

9. The method of claim 6, wherein said compound represented by the formula (2) is a sorbitan-(polyoxyethylene alkylether monofatty acid) ester wherein $R^4$ is —$CH_2$—$CH_2$—, $R^6$ is a $C_1$–$C_{60}$ alkyl group or a $C_1$–$C_{60}$ alkenyl group, and $R^5$ is a hydrogen atom or $C_1$–$C_{60}$ alkyl group.

10. The method of claim 6, wherein said vibration-molded hollow product is an automobile engine intake manifold.

11. The method of claim 6 wherein vibration welding is carried out at a vibration frequency of 100 to 300 Hz with a vibration amplitude of 0.5 to 2.0 mm and a welding pressure of 5 to 100 kg/cm$^2$.

12. The method of claim 11 wherein the vibration amplitude is 0.8 to 1.6 mm.

13. The method of claim 11 wherein the welding pressure is 10 to 60 kg/cm$^2$.

* * * * *